UNITED STATES PATENT OFFICE.

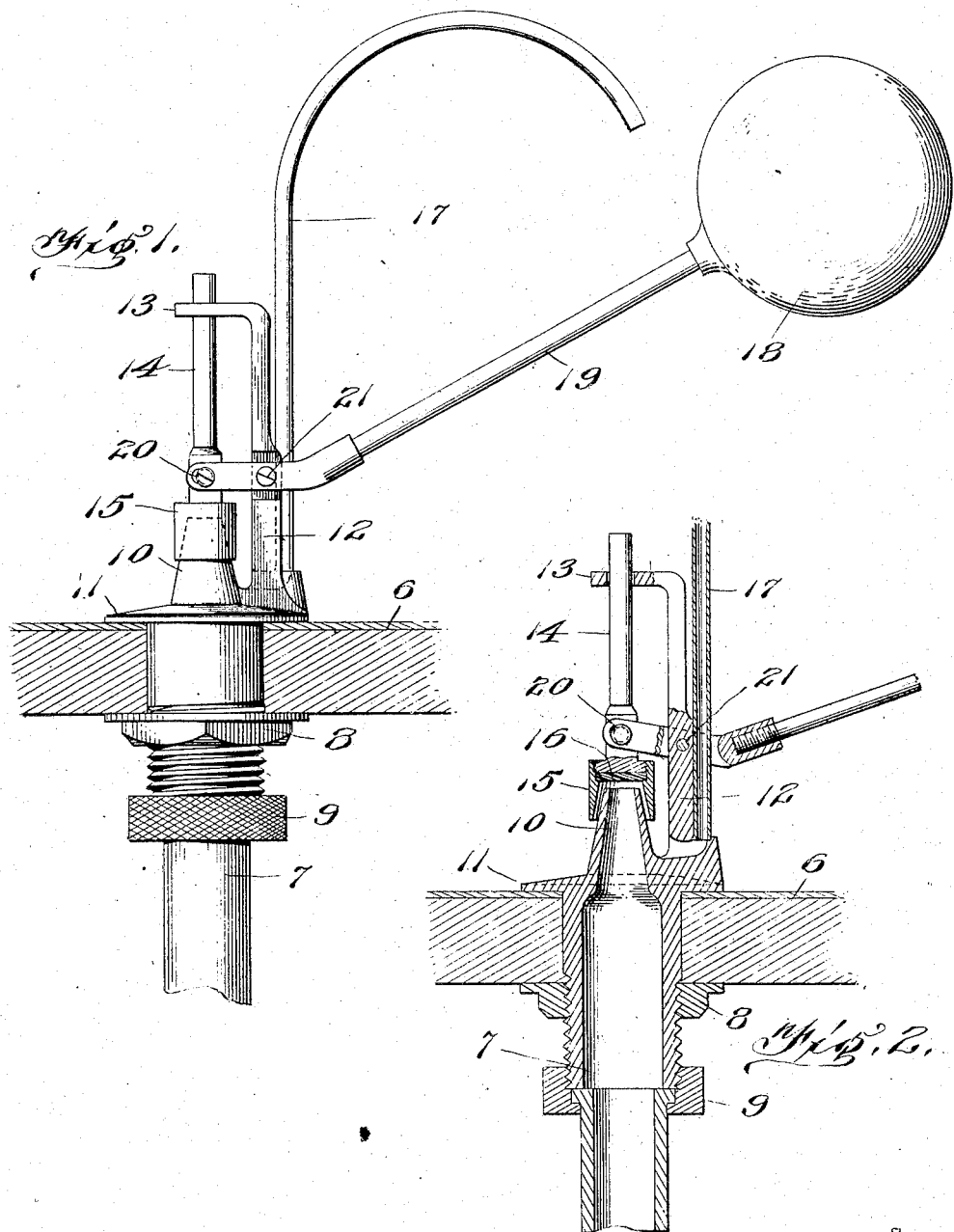

ALBERT D. HERSCHLER, OF ASHLAND, OHIO.

TANK-VALVE.

947,234.

Specification of Letters Patent.　Patented Jan. 25, 1910.

Application filed April 17, 1909.　Serial No. 490,473.

*To all whom it may concern:*

Be it known that I, ALBERT D. HERSCHLER, a citizen of the United States, residing at Ashland, in the county of Ashland and State of Ohio, have invented certain new and useful Improvements in Tank-Valves, of which the following is a specification.

This invention relates to improvements in tank valves, and is especially adapted for those used on water closet flush tanks, the object being to provide an improved float valve with few and simple parts, and characterized particularly by a plunger having a cupped valve which closes upon a raised valve seat, the plunger being guided by a standard. A refill tube is so located with respect to the valve that as the water is discharged through the valve it will be carried up through the tube for the purpose of refilling the bowl as the tank is filling.

The invention is illustrated in the accompanying drawings in which—

Figure 1 is a side elevation of the valve. Fig. 2 is a sectional view thereon.

Referring specifically to the drawings, the tank bottom is indicated at 6. The inlet pipe 7 extends through this bottom and is provided with a lock nut 8 and a coupling nut 9 under said bottom. At the top the pipe section 7 is provided or formed with a tapered or frusto conical valve seat 10 at the base of which a flange 11 projects to rest on the tank bottom, against which it is tightly clamped by the lock nut 8. At one side the flange forms a base for the standard 12, which is preferably formed integral with the base and which has at the top the plunger or valve stem guide 13 which overhangs the valve seat and is in line therewith. The valve stem or plunger 14 works at its upper end through said guide. At its lower end it has a cupped head 15 containing packing 16, and the flanges or sides of the cup fit around or inclose the upper end of the valve seat, whereby the direction of discharge through the valve is downward on the outer sides of the valve seat. The valve seat fitting also supports the refill tube 17, the lower end of which opens through or beside the base of the standard 12 with its entrance opposite the tapered side of the valve seat 10 and in line with the flow of water as it passes downwardly from the valve. The valve is operated by a float 18 at one end of a lever 19 the other end of which is pivoted to the valve stem at 20, the lever being fulcrumed to the standard at 21. The absence of numerous or complicated parts is obvious.

With respect to operation, when the float falls the valve is lifted and the water flows out noiselessly and down the outside of the valve seat to the bottom of the tank. At the same time a certain amount of the water will enter the inlet to the refill tube and will be forced up through the same, from which it will flow into the flush pipe as usual, for the intended purpose. By placing the inlet and the refill tube in line with the flow of water this result is accomplished without further means. The depending flanges or sides of the cup, around the tapered valve seat, in connection with the guide 13, prevent the valve from getting out of position. When the float rises the valve is closed, pressing the packing to contact with the top of the valve seat in an obvious manner.

An especially advantageous feature of the valve is its simplicity and the few parts required, there being but two main castings, that is, the valve seat casting and the plunger.

I claim:

1. The combination of a pipe having a valve seat and opening at the end thereof, a cupped valve surrounding said seat and movable to and from the same, the sides of the valve causing reverse flow along the outside of the seat, and a refill tube having its inlet opposite the base of the seat and in the line of said reverse flow.

2. The combination of an inlet pipe, a tapered valve seat at the top thereof, a cupped valve surrounding the seat and movable up and down to and from the same, the sides of the valve causing flow downwardly beside the valve seat, a refill tube having its inlet opposite the base of the seat and in the line of flow beside the same, and a float operatively connected to the valve.

In testimony whereof, I affix my signature in presence of two witnesses.

ALBERT D. HERSCHLER.

Witnesses:
MAURICE T. SEMPLE,
EDWARD H. PILLE.